(12) United States Patent
Kyutoku

(10) Patent No.: US 7,669,533 B2
(45) Date of Patent: Mar. 2, 2010

(54) CONNECTION RAIL FOR A RAIL TRANSPORT APPARATUS

(75) Inventor: Senzo Kyutoku, Ise (JP)

(73) Assignee: Muratec Automation Co., Ltd., Kyoto-Shi (JP)

( * ) Notice: Subject to any disclaimer, the term of this patent is extended or adjusted under 35 U.S.C. 154(b) by 109 days.

(21) Appl. No.: 11/941,523

(22) Filed: Nov. 16, 2007

(65) Prior Publication Data

US 2008/0127851 A1   Jun. 5, 2008

(30) Foreign Application Priority Data

Nov. 17, 2006   (JP)   ............................. 2006-311595

(51) Int. Cl.
*E01B 25/26* (2006.01)
(52) U.S. Cl. ........................... 104/130.09; 104/130.07; 104/130.01
(58) Field of Classification Search .................. 104/246, 104/130.01, 130.04, 130.07, 130.09
See application file for complete search history.

(56) References Cited

U.S. PATENT DOCUMENTS

| 6,220,173 B1 * | 4/2001 | Sauerwein ............. 104/130.01 |
| 6,418,856 B2 * | 7/2002 | Hossfield et al. ....... 104/130.01 |
| 6,931,996 B2 * | 8/2005 | Matsukawa .................. 104/96 |

FOREIGN PATENT DOCUMENTS

JP   2001-270435 A   10/2001

* cited by examiner

*Primary Examiner*—S. Joseph Morano
*Assistant Examiner*—Zachary Kuhfuss
(74) *Attorney, Agent, or Firm*—Young & Thompson

(57) ABSTRACT

The connection guide for a rail transport apparatus is provided with a first direction control guide and a second direction control guide such that when the transport vehicle travels in a forward direction, after the guiding operation of the first direction control guide is released the transport vehicle is guided by the second direction control guide, wherein a forward shift guide abuts a guide roller of the transport vehicle during the shift operation.

8 Claims, 8 Drawing Sheets

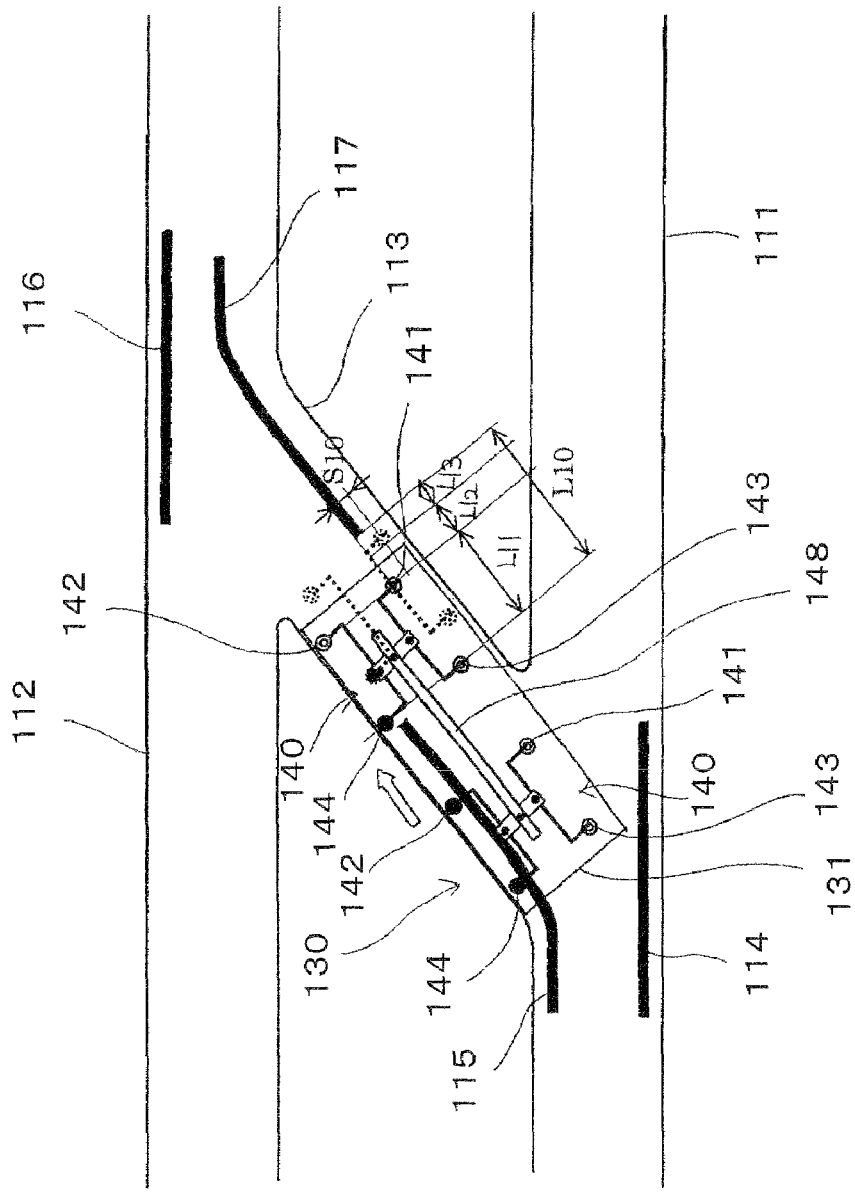

CONNECTION RAIL FOR A RAIL TRANSPORT APPARATUS

BACKGROUND OF THE INVENTION

1; Field of the Invention

This invention relates to a rail transport apparatus which transports objects by means of vehicles running on rails.

2. Description of Related Art

Reference '435 (Japanese Patent Application Laid-Open under No. 2001-270435) discloses a rail transport apparatus which transports objects by way of transport vehicles supported by and suspended from the rails provided on the ceiling. Since such a suspension-type rail transport apparatus does not occupy the floor, it is useful for a clean room for semi-conductor manufacturing in which unit price for space is expensive.

Recently, in the semiconductor manufacturing factory, the scale of production is being remarkably enlarged and complicated. Therefore, the route of the rail provided in the above-mentioned transport apparatus becomes complicated and includes many branches and junctions.

However, in the transport apparatus disclosed in the Reference '435, in an area in which one traveling rail is connected to another traveling rail via a connection rail, the connection rail becomes relatively long. As mentioned above, the unit price of the space is high in the clean room for the semiconductor manufacturing, and hence it is necessary to reduce the area occupied by the rail as much as possible. Therefore, there is a need to reduce the area occupied by the rail as much as possible and shorten the connection rail further.

SUMMARY OF THE INVENTION

It is an object of the present invention to provide a rail transport apparatus in which a connection rail for connecting two rails is shortened.

According to one aspect of the present invention, there is provided a rail transport apparatus including: a rail including a first major rail, a second major rail and a connection rail connecting the first major rail and the second major rail; a first direction control guide which extends in an extending direction of the connection rail on one side of a width direction of the connection rail and extends to the first major rail; a second direction control guide which extends in the extending direction of the connection rail on the other side of the width direction of the connection rail in a manner not overlapping with the first direction control guide and extends to the second major rail; a transport vehicle supported and guided by the rail to travel, the transport vehicle including a plurality of roller units each having a first roller guided by the first direction control guide and a second roller guided by the second direction control guide; and a forward shift guide which guides the roller unit to a position at which the second roller of one roller unit is guided by the second direction control guide, after a guiding operation of the first roller of the one roller unit by the first direction control guide is released, when the transport vehicle travels on the rail in a forward direction from a side of the first major rail to a side of the second major rail.

By the rail transport apparatus described above, the roller unit in which the guiding operation of the first roller by the first direction control guide is released can be forcibly shifted to the position at which the second roller of the roller unit is guided by the second direction control guide. Therefore, it is necessary that the length of the interval area between the first direction control guide and the second direction control guide is equal to the sum of the length of one roller unit in the traveling direction and the distance that the roller unit moves during the shift of the second roller to the position guided by the second direction control guide. It is unnecessary to keep the length for the emergency stop of the transport vehicle at the time of failure of shift operation. Therefore, the length of the connection rail can be shortened by the length for the emergency stop.

In one form of the above rail transport apparatus, the forward shift guide may intersect a virtual extension line of the first direction control guide extending in the extending direction of the connection rail, the forward shift guide may extend to a position to abut on the first roller when the second roller is at a position to be guided by the second direction control guide, and the forward shift guide may have a forward-shift abutting surface which abuts on and guides the first roller.

In this configuration, the first roller which is released from the guiding operation by the first direction control guide can abut on the forward-shift abutting surface of the forward shift guide, and the second roller can be securely guided to the position to be guided by the second direction control guide.

In another form of the above rail transport apparatus, the shape of the forward-shift abutting surface in a guiding direction may be a sine curve shape. In this configuration, the impact on the transport vehicle can be reduced during the shift operation which shifts the roller unit to the position where the second roller is guided by the second direction control guide, after the guide operation of the first roller by the first direction control guide is released. Therefore, it can be prevented that any deficiency such as damage occurs to the transported object transported by the transport vehicle.

In still another form of the above rail transport apparatus, the shape of the forward-shift abutting surface may be determined such that a velocity of the roller unit, in the width direction of the connection rail, guided by the forward shift guide and traveling at a constant velocity in the extending direction of the connection rail first increases with a constant acceleration, keeps a constant velocity for a predetermined time period after reaching the constant velocity and decreases with the constant acceleration after the predetermined time period has passed.

In this configuration, the impact of the transport vehicle during the shift operation can be securely reduced. Therefore, it can be prevented that any deficiency such as damage occurs to the transported object transported by the transport vehicle.

Instill another form, the above rail transport apparatus may further include a reverse shift guide which guides the roller unit to a position at which the first roller of one roller unit is guided by the first direction control guide, after a guiding operation of the second roller of the one roller unit by the second direction control guide is released, when the transport vehicle travels on the rail in a reverse direction from a side of the second major rail to a side of the first major rail.

In this configuration, even if the transport vehicle is moved in the reverse direction, the length for the emergency stop is unnecessary. If the length of the interval area is equal to the sum of the length of one roller unit in the traveling direction and the distance that the roller unit moves during the shift of the first roller to the position guided by the first direction control guide, the roller unit can be shifted to the position where the first roller is guided by the first direction control guide after the guide operation of the second roller by the second direction control guide is released.

In still another form of the above rail transport apparatus, the reverse shift guide may intersect a virtual extension line of the second direction control guide extending in the extending direction of the connection rail, the reverse shift guide may extend to a position to abut on the second roller when the first roller is at a position to be guided by the first direction control guide, and the forward shift guide may have a reverse-shift abutting surface which abuts on and guides the second roller.

In this configuration, the second roller which is released from the guiding operation by the second direction control guide can abut on the reverse-shift abutting surface of the reverse shift guide, and the first roller can be securely guided to the position to be guided by the first direction control guide.

In still another form of the above rail transport apparatus, the shape of the reverse-shift abutting surface in a guiding direction may be a sine curve shape. In this configuration, the impact on the transport vehicle can be reduced during the reverse shift operation, and it can be prevented that any deficiency such as damage occurs to the transported object.

In still another form of the above rail transport apparatus, the shape of the reverse-shift abutting surface may be determined such that a velocity of the roller unit, in the width direction of the connection rail, guided by the reverse shift guide and traveling at a constant velocity in the extending direction of the connection rail first increases with a constant acceleration, keeps a constant velocity for a predetermined time period after reaching the constant velocity and decreases with the constant acceleration after the predetermined time period has passed. In this configuration, the impact on the transport vehicle can be reduced during the reverse shift operation, and it can be prevented that any deficiency such as damage occurs to the transported object.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 9 shows a transport vehicle of a comparative example traveling an area having a branch and a junction.

DETAILED DESCRIPTION OF THE PREFERRED EMBODIMENTS

The preferred embodiments of the present invention will now be described below with reference to the attached drawings.

Figure 1:
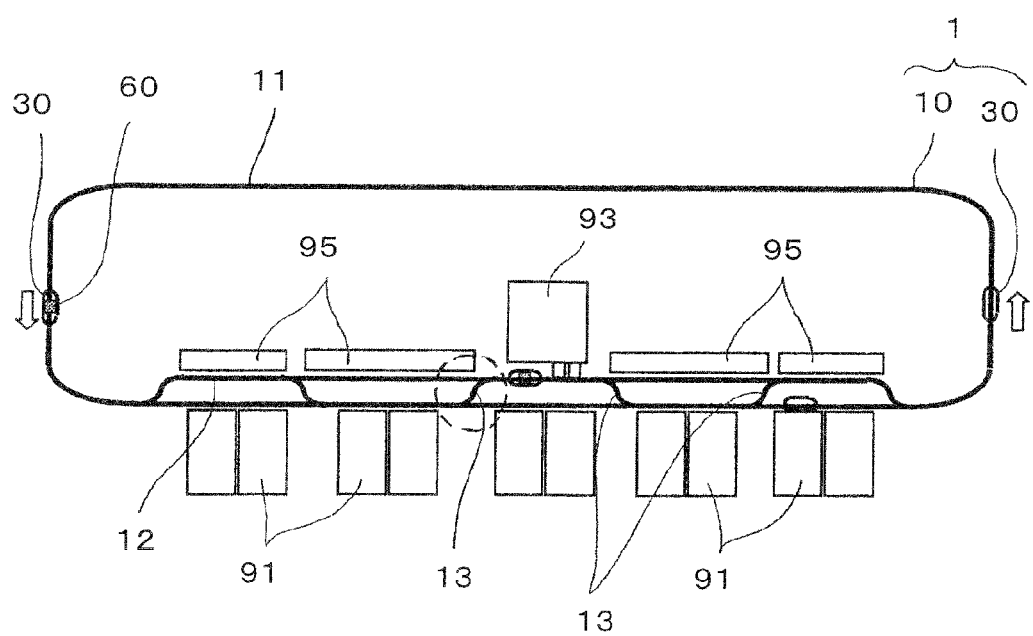
FIG. 1 shows a schematic configuration of an OHT ("Over head Hoist Transport") transport system using OHT according to an embodiment of the present invention.

The rail transport apparatus according to the embodiment of the present invention is a transport apparatus which is provided in a semiconductor manufacturing facility and transports FOUP (Front Opening Unified Pod) accommodating substrates. The rail transport apparatus is a suspension-type transport apparatus (OHT: Over head Hoist Transport) which transports vehicles holding the FOUP and supported by rails provided on the ceiling. FIG. 1 is a plan view schematically showing an OHT transport system to which the invention is applied.

As shown in FIG. 1, the rail 10 of the OHT 1 according to the invention includes an annular main rail 11, a sub-rail 12 provided in parallel with a part of the main rail 11 and a plurality of connection rails 13 which connect the main rail 11 and the sub-rail 12. A plurality of semiconductor manufacturing apparatuses 91 are placed on the outside of and under the annular main rail 11. The sub-rail 12 is in parallel with the part of the main rail 11 at which the semiconductor manufacturing apparatuses 91 are adjacently placed. Under the sub-rail 12, there are provided a stocker 93 which stocks the FOUPs 60 and a plurality of simple buffers 95s which temporarily store the FOUPs 60, if necessary, for the adjustment of processes.

A transport vehicle 30 is supported by the above-mentioned rail 10 in a suspended manner, and travels along the rail 10 with being guided by the rail 10. The transport vehicle 30 travels, with holding the FOUP 60, between the semiconductor manufacturing apparatuses 91, the stocker 93 and the simple buffers 95, thereby to put the FOUP 60 on them and to collect the FOUP 60 from them. Although the transport vehicle 30 normally travels in a forward direction (counter-clockwise direction shown by the arrow in FIG. 1), it may travel in the reverse direction at the time of the restoration work from the trouble situation or the maintenance work.

Figure 2:
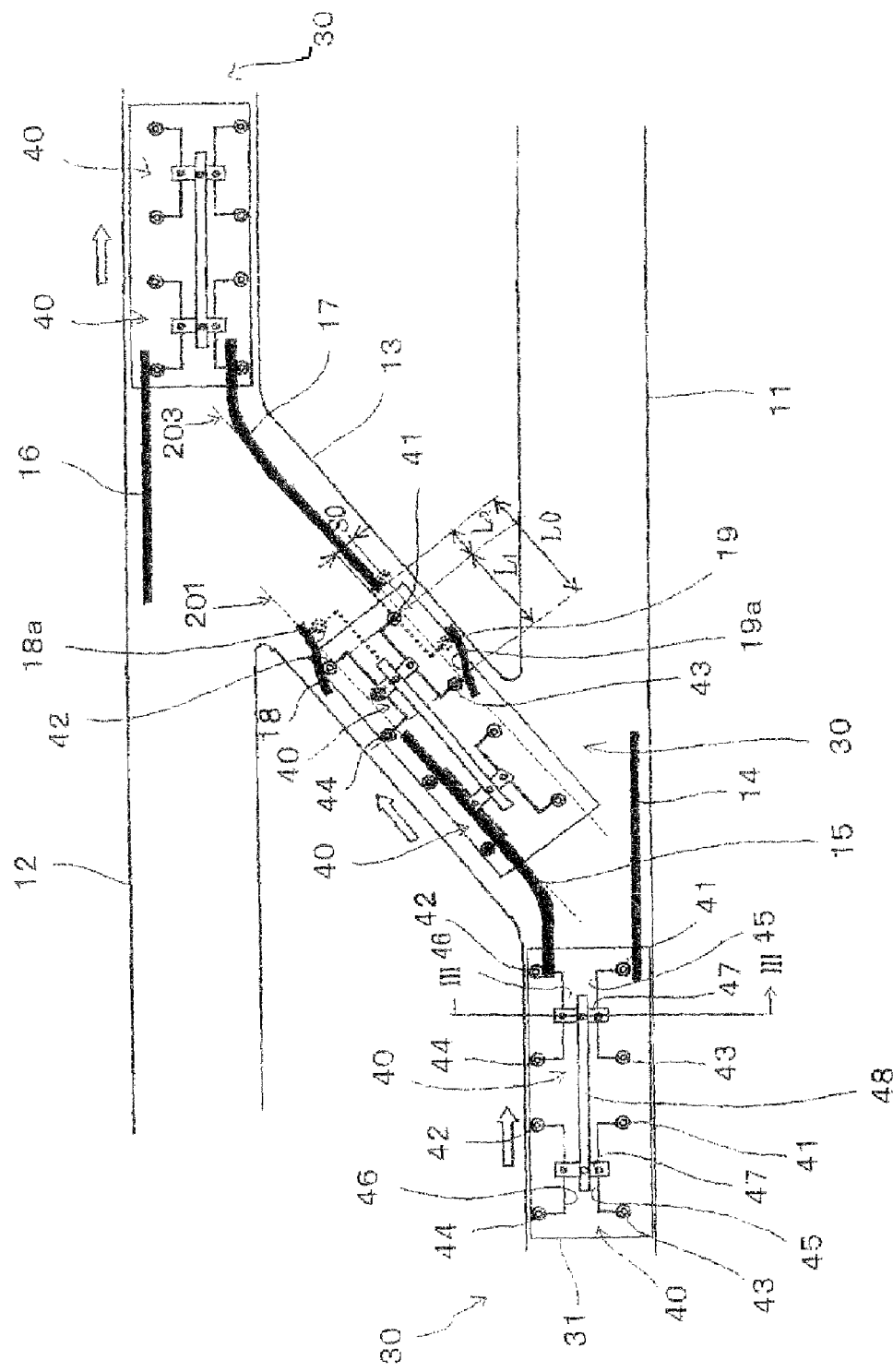
FIG. 2 is a magnifying view of a part of a rail shown in FIG. 1.
Figure 3:
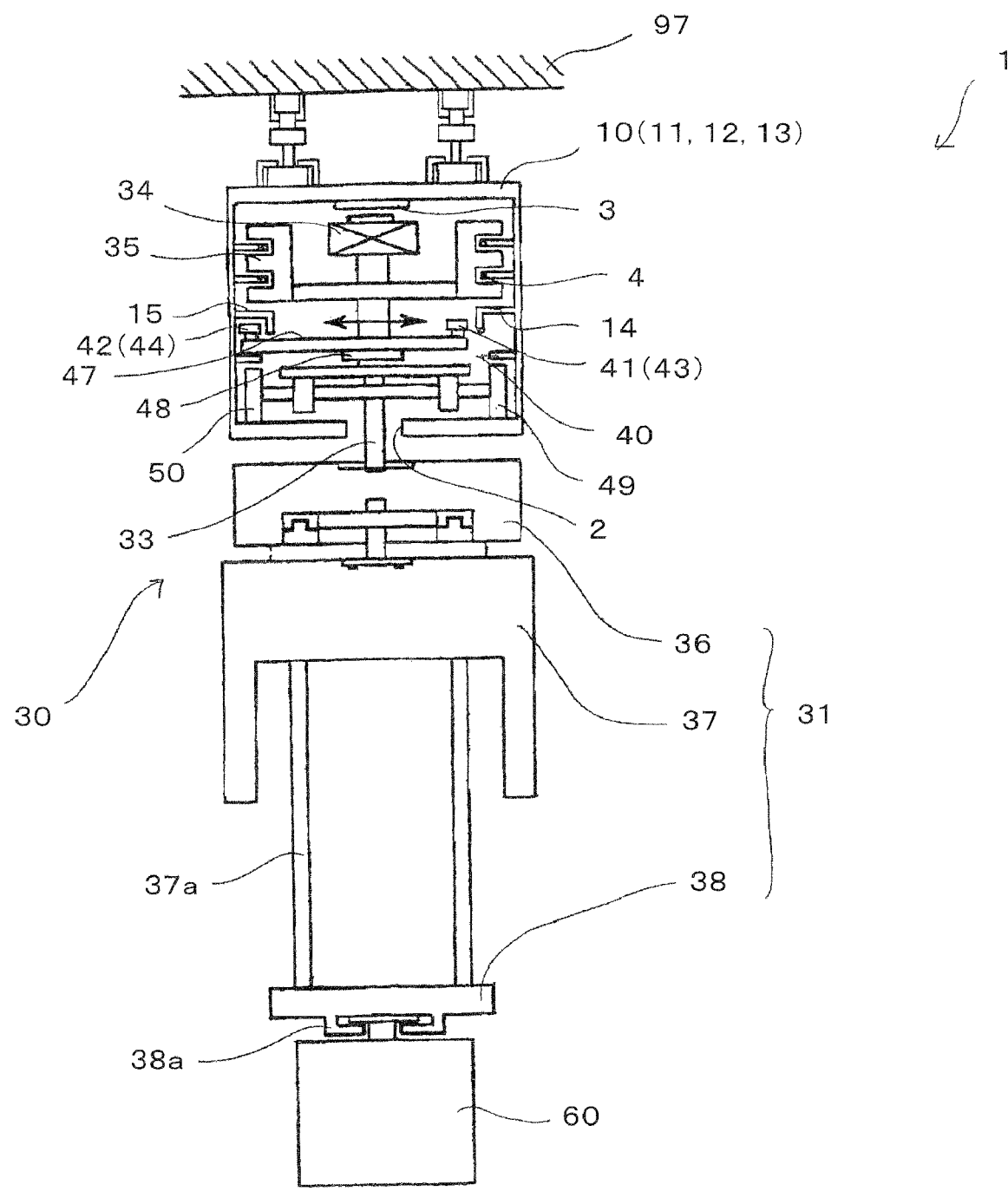
FIG. 3 is a sectional view along the III-III line in FIG. 2.

Next, the configuration of the OHT 1 will be described in more detail. FIG. 2 is a perspective view of the OHT 1 from above, and shows a magnified view of the area (surrounded by the broken line) around the connection rail 13 in FIG. 1. FIG. 3 is a sectional view of the rail 10 cut along the line III-III corresponding to the width direction of the rail 10.

As shown in FIG. 3, the rail 10 is a duct-like member having a substantially rectangular sectional shape, and is provided to be suspended from the ceiling 97. At the bottom wall (surface) of the duct-like rail 10, a slit 2 is provided along the extension direction (in the direction of the front-back side of the drawing sheet of FIG. 3) for suspending a vehicle unit 31 described later.

As shown in FIG. 2, direction control guides 14 to 17, a forward shift guide 18 and a reverse shift guide 19 are provided near the connection rail 13 of the rail 10. As shown in FIG. 3, these guides 14 to 19 are members provided at the internal side surface of the rail 10 in a manner substantially in parallel with the internal upper surface of the rail 10. One end of the guides 14 to 19 are integrated with the internal side wall of the rail 10, and the other end of the guides 14 to 19 are formed in a fashion being bent to the lower direction.

As shown in FIG. 2, the direction control guides 14 and 15 are provided near the connecting portion of the main rail 11 and the connection rail 13. The direction control guide 14 extends in the extending direction of the main rail 11 on one side (the lower side in FIG. 2) of the width direction of the main rail 11. The direction control guide 15 extends in the extending direction of the main rail 11 on the other side (the upper side in FIG. 2) of the width direction of the main rail 11, curves at the branching point to the connection rail 13 and then extends in the extending direction of the connection rail 13 on the other side (the left side in FIG. 2) of the width direction of the connection rail 13.

On the other hand, the direction control guides 16 and 17 are provided near the connecting portion of the sub-rail 12 and the connection rail 13. The direction control guide 16 extends in the extending direction of the sub-rail 12 on one side (the upper side in FIG. 2) of the width direction of the sub-rail 12. The direction control guide 17 extends in the extending direction of the connection rail 13 on one side (the right side in FIG. 2) of the width direction of the connection rail 13, curves at the junction of the sub-rail 12 and the connection rail 13, and then extends in the extending direction of the sub-rail 12 on one side (the lower side in FIG. 2) of the width direction of the sub-rail 12. It is noted that, in the connection rail 13, the direction control guide 15 and the direction control guide 17 do not overlap with each other with respect to the extending direction of the connection guide 13. Namely, the direction control guide 15 and the direction control guide 17 are remote from each other, with an interval area of length L0 therebetween, with respect to the extending direction of the connection rail 13.

The forward shift guide 18 is provided on the other side (the left side in FIG. 2) of the width direction of the connection guide 13, and has an abutting surface 18a on which the guide roller 42 of the traveling unit (roller unit) 40 shifting in the width direction of the connection rail 13 abuts within the interval area when the transport vehicle 30 travels in the forward direction (the direction shown by the arrow in FIG. 2). The reverse shift guide 19 is provided on one side (the right side in FIG. 2) of the width direction of the connection guide 13, and has an abutting surface 19a on which the guide roller 43 of the traveling unit 40 shifting in the width direction of the connection rail 13 abuts within the interval area when the transport vehicle 30 travels in the reverse direction. The shapes of the abutting surface 18a of the forward shift guide 18 and the abutting surface 19a of the reverse shift guide 19 will be described later.

Returning to FIG. 3, a secondary side permanent magnet 3 is provided on the internal upper wall of the rail 10. The secondary side permanent magnet 3 is a secondary side member of the linear motor which is a driving source of the transport vehicle 30. As the secondary side permanent magnet 3, a lot of permanent magnets formed into a predetermined shape are arranged along the extending direction (the front-back direction of the drawing sheet of FIG. 3) with the polarity of the magnets reversed one by one.

On the internal side wall of the rail 10, there is provided a pair of primary side power feeding line 4 extending along the extending direction (the front-back direction of the drawing sheet of FIG. 3). The pair of primary side power feeding line 4 is a turnaround line, including a going line and a returning line. A high frequency electric power is applied to the primary side power feeding line 4, and the primary side power feeding line 4 realizes, together with the secondary side iron core 35 provided on the transport vehicle 30 as described later, the non-contact power feeding to the transport vehicle 30. It is noted that the primary side power feeding line 4 is also used as a communication line between a controller (not shown), which controls the movement of the transport vehicle 30, and the transport vehicle 30.

As shown in FIG. 3, on the -transport vehicle 30, there is provided a primary side laminated iron core 34 in a manner confronting, with a predetermined space therebetween, the secondary side permanent magnet 3 provided on the internal upper wall of the rail 10. The primary side laminated iron core 34 is a primary side member constituting the linear motor together with the secondary side permanent magnet 3, and the coil is wound around the primary side laminated iron core 34.

The transport vehicle 30 includes the secondary side iron core 35 having a substantially "E" sectional shape. Into two recessed portions of the "E" shape of the secondary side iron core 35, the pair of the primary side power feeding line 4 provided on the internal side wall of the rail 10 is inserted. When the high frequency electric power is applied to the primary side power feeding line 4, the primary side high frequency electric power is induced to the coil (not shown) wound around the secondary side iron core 35, and the power is transmitted in non-contact manner. This non-contact power feeding covers all power necessary in the transport vehicle 30.

Here, the description will be given of the driving method of the linear motor which is a driving source of the transport vehicle 30. First, the high frequency electric power induced to the secondary side iron core 35 by the above-mentioned non-contact power feeding method is converted to the direct current by the full-wave rectification in the rectifying unit (not shown), then converted to the three-phase alternating current of PWM system by the electric power control unit (not shown), and then supplied to the primary side laminated iron core 34 constituting the linear motor. When the electric power is supplied to the primary side laminated iron core 34, a linearly moving traveling magnetic field is generated in the primary laminated iron core 34, and a driving force is generated in the primary side laminated iron core 34 by the magnetic action between the primary side laminated iron core 34 and the secondary side permanent magnet 3 confronting each other. As described later, the primary side laminated iron core 34 is connected to the traveling unit 40 which is able to travel in the rail 10 of duct-like shape. Therefore, the traveling unit 40 is given the driving force along the extending direction of the rail 10 by the linear motor, and travels in the rail 10.

The transport vehicle 30 further includes a vehicle unit 31, and two traveling units 40 which have identical configuration and are arranged in alignment with each other in the traveling direction of the transport vehicle 30. As shown in FIG. 3, the traveling unit 40 is positioned in the rail 10 of duct-like shape. The vehicle unit 31 is connected to each of the two traveling units 40 by the suspension member 33 extending outside from the inside of the rail 10 via the slit 2 of the rail 10, and is held under the rail 10 in the suspending fashion.

Figure 4:
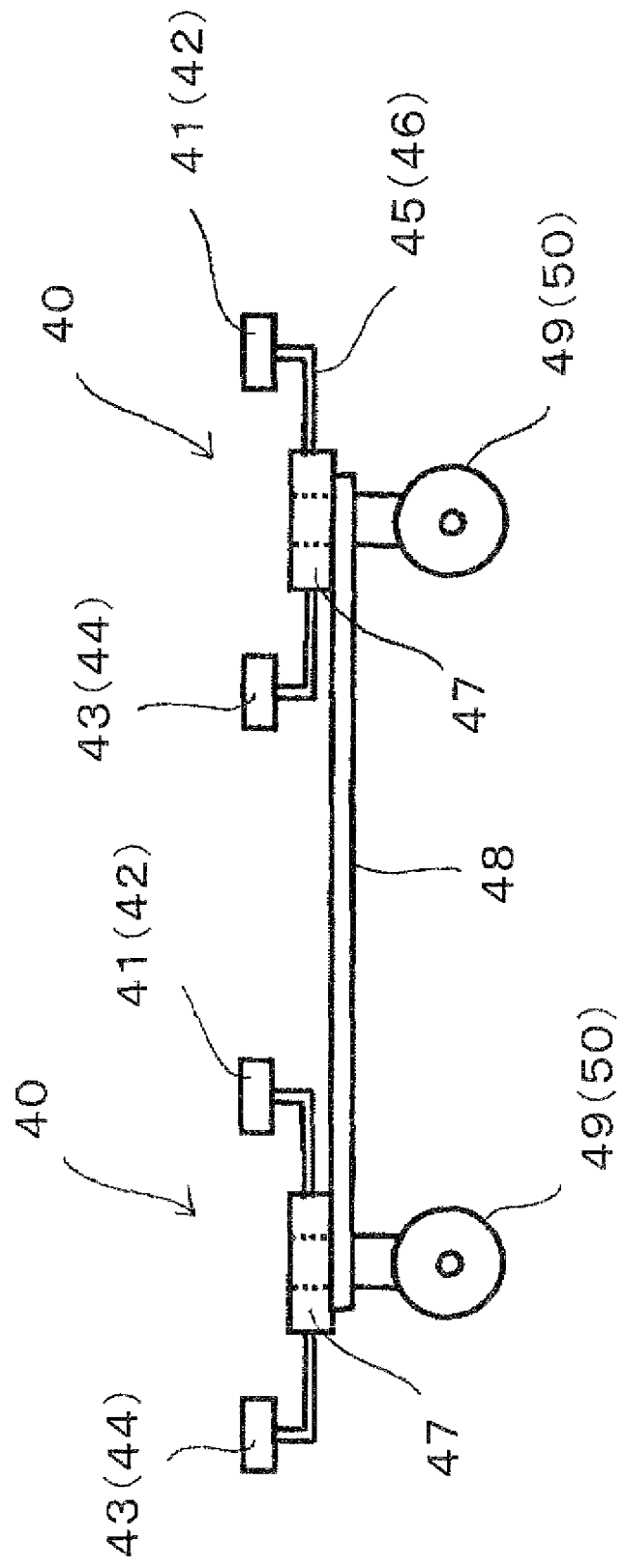
FIG. 4 is a side view of the traveling unit shown in FIG. 2.

Here, with further reference to FIG. 4 showing a side view of the traveling unit 40, the configuration of the traveling unit 40 will be described. Each of the traveling unit 40 includes four guide rollers 41 to 44 for selecting the traveling direction of the transport vehicle 30, and two traveling rollers 49 and 50 for moving the transport vehicle 30.

The guide rollers 41 to 44 are rotatable in a horizontal direction. Two of the guide rollers 41 to 44 are provided on one end in the width direction of the traveling unit 40 and other two of them are provided on the other end in the width direction of the traveling unit 40. By making the guide roller abut on one of the direction control guides 14 to 17 at the branch or junction of the rail 10, the straight advance, the branching movement or the merging movement of the transport vehicle 30 can be selected.

As shown in FIGS. 2 and 4, two guide rollers 41 and 43 on one side of the width direction are linked with each other by the arm 45. Similarly, two guide rollers 42 and 44 on the other side of the width direction are linked with each other by the arm 46. Further, the arms 45 and 46 are linked with each other by the arm link member 47 extending in the width direction of the traveling unit 40 (i.e., the width direction of the rail 10). The arm link member 47 can be driven along its extending direction by a unit driving mechanism not shown. Namely, each of the traveling unit 40 can shift in the width direction of the rail 10 by the driving operation of the unit driving mechanism. The arm link member 47 of each of the traveling unit 40 is linked with each other in a swingable manner by the unit link member 48.

The traveling rollers 49 and 50 are provided on both ends in the width direction of the traveling unit 40, and are swingable in contact with the internal lower surface of the rail 10 as shown in FIG. 3

The vehicle unit 31, held in the suspending manner with respect to the two traveling units 40 as described above, includes a vehicle position adjustment mechanism 36, a suspension mechanism 37 and a grip mechanism 38. The vehicle position adjustment mechanism 36 is movable within a horizontal surface, and is a positioning mechanism used when the FOUP 60, which is a transported object, is put down or collected. The suspension mechanism 37 is a mechanism for sending and winding the suspension belt 37a. The grip mechanism 38 is attached to the end of the suspension belt 37a and can hold the FOUP 60 by the gripper 38a.

Here, with reference to FIG. 2, the description will be given of the operation in which the transport vehicle 30 traveling in the forward direction (the direction shown by the arrow in FIG. 2) goes off the main rail 11 and goes into the sub-rail 12. In the following description, the width direction and the extending direction of the rail 10 (the main rail 11, the sub-rail 12 and the connection rail 13) will be simply referred to as "width direction" and "extending direction", respectively.

First, when the transport vehicle 30 traveling on the main rail 11 in the forward direction is guided to go into the connection rail 13, the unit driving mechanism shifts, by its driving force, the two traveling units 40 of the transport vehicle 30 traveling on the main rail 11 to the other direction of the width direction (the upper direction in FIG. 2) In this state, when the transport vehicle 30 travels to the connection part with the connection rail 13, the guide rollers 42 and 44 of the two traveling units 40 on the other side of the width direction are guided by the direction control guide 15, and the transport vehicle 30 runs into the connection rail 13.

Thereafter, the guiding operation, by the direction control guide 15, of the guide rollers 42 and 44 of the traveling unit 40 positioned on the front side of the transport vehicle 30 is released, and then the traveling unit 40 running in the extending direction at a constant speed is shifted to the one side of the width direction (the right side in FIG. 2) within the interval area by the driving force of the unit driving mechanism. Thus, the guide roller 41 of the traveling unit 40 on the front side and on the one side of the width direction is shifted to the position (shown by the broken line in FIG. 2) to be guided by the direction control guide 17. Thereby, the guide rollers 41 and 43 of the traveling unit 40 on the front side are guided by the direction control guide 17. Then, the same shift operation is carried out for the traveling unit 40 of the rear side in the traveling direction within the interval area, and the transport vehicle 30 runs into the sub-rail 12.

During the above shift operation, the guide roller 42 on the other side in the width direction and on the front side in the traveling direction abut on the abutting surface 18a of the forward shift guide 18. Namely, the abutting surface 18a of the forward shift guide 18 intersects the virtual extension line of the direction control guide 15 (shown by broken axis line 201) along the extending direction of the connection guide 13. Further, the abutting surface 18a extends from a guide releasing point to a guide restating point. The guide releasing point is a point, at which the guide roller 42 of the traveling unit 40 whose guiding operation by the direction control guide 15 is released abuts on the abutting surface 18a. The guide restating point is a point, at which the guide roller 42 abuts on the abutting surface 18a when the guide roller 41 of the traveling unit 40 is at the position to be guided by the direction control guide 17. It is noted that none of the guide rollers 41 to 44 abuts on the reverse shift guide 19 during the shift operation in the forward traveling direction.

Figure 5:
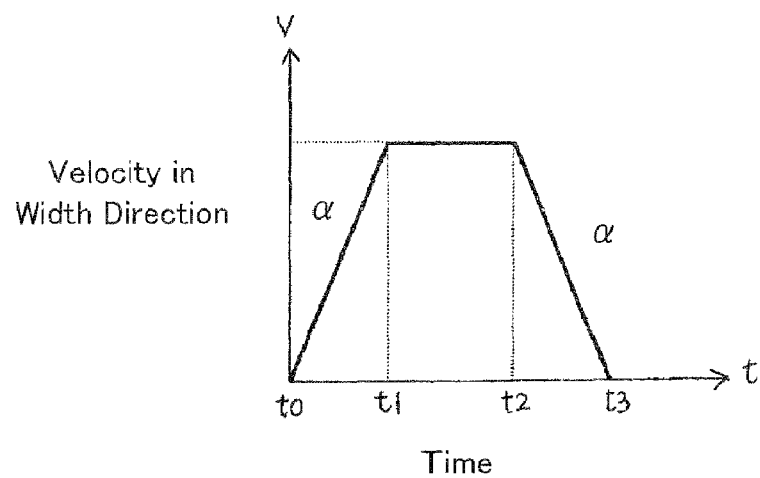
FIG. 5 shows a velocity variation of a traveling unit shown in FIG. 2 in a width direction of a connection rail during shift operation.

FIG. 5 shows the velocity variation of the traveling unit 40 with respect to the width direction when the shift operation is carried out as described above. As shown in FIG. 5, the velocity v of the traveling unit 40 in the width direction increases with the acceleration $\alpha$ ($\alpha$ is constant) from the time t0 to t1, keeps the constant velocity until the time t2 after reaching the constant velocity at the time t1, and decreases with the acceleration $\alpha$ from the time t2 to t3. Therefore, the velocity v1 during the time $t0 \leq t \leq t1$, the velocity v2 during the time $t1 < t \leq t2$, and the velocity v3 during the time $t2 < t \leq t3$ are expressed by the following equations (1) to (3):

$$v1 = \alpha \cdot t \tag{1}$$

$$v2 = \alpha \cdot t1 \tag{2}$$

$$v3 = \alpha \cdot (t1 + t2 - t) \tag{3}$$

In this embodiment, the unit driving mechanism for driving the traveling unit 40 is controlled by the controller (not shown) such that the velocity of the traveling unit 40 in the width direction varies as described above during the shift operation. Thereby, the impact on the transport vehicle 30 during the shift operation can be reduced. Therefore, it can be prevented that the substrates accommodated in the FOUP 60 held by the transport vehicle 30 slide, generate friction and thereby generate particles, causing the pattern defect and deteriorating the yield of the products.

The moving distance S of the traveling unit 40 in the width direction during the shift operation is expressed by the following equations (4) to (6):

$$S = \frac{1}{2} \alpha \cdot t^2 \quad (t0 \leq t \leq t1) \tag{4}$$

$$S = \frac{1}{2} \alpha \cdot t1^2 + v_2 \cdot (t - t1) \quad (t1 < t \leq t2) \tag{5}$$

$$S = \frac{1}{2} \alpha \cdot t1^2 + v_2 \cdot (t2 - t1) + \frac{1}{2} \alpha (t - t2)^2 \quad (t2 < t \leq t3) \tag{6}$$

Figure 6:
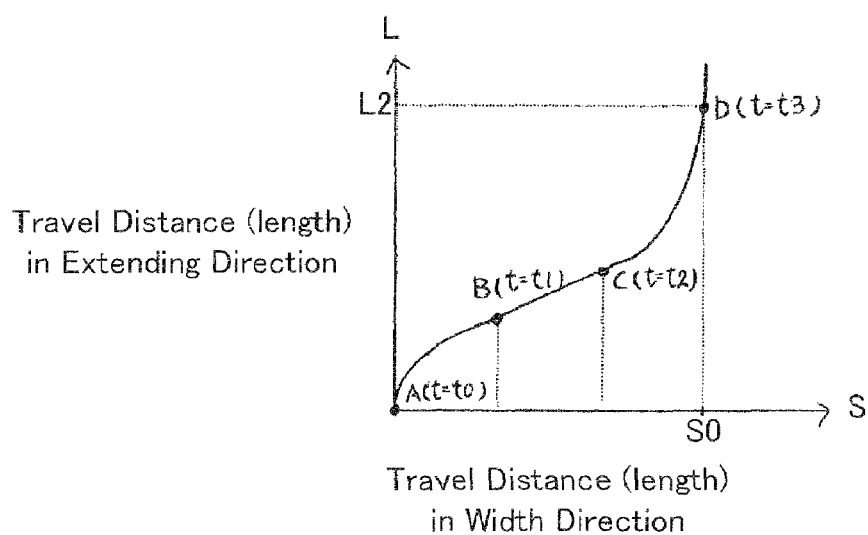
FIG. 6 shows a locus of the traveling unit shown in FIG. 2 during the shift operation, which has a shape corresponding to the shape of abutting surfaces of a forward shift guide and a reverse shift guide along the guiding direction.

Here, the velocity of the traveling unit 40 in the extending direction during the shift operation is constant. Therefore, the relation between the moving distance S of the traveling unit 40 in the width direction during the shift operation and the moving distance L of the traveling unit in the extending direction (i.e., the locus of the traveling unit 40 during the shift operation) is as shown in FIG. 6. In FIG. 6, the points A, B, C and D correspond to the time t0, t1, t2 and t3, respectively. As shown in FIG. 6, the locus of the traveling unit 40 during the shift operation is indicated by the smooth line. The locus of the traveling unit 40 is a secondary curved line from time t0 to t1 and time t2 to t3, and is a straight line from time t1 to t2. In this embodiment, the distance L2 that the traveling unit 40 runs in the extending direction during the shift operation is obtained by subtracting the length L1 of a single traveling unit 40 from the length L0 of the interval area between the direction control guides 15 and 17.

The shape of the abutting surface 18a of the forward shift guide 18, from the guide releasing point to the guide restarting point, on which the guide roller 42 abuts during the shift operation (i.e., the shape along the guiding direction) coincides with the curve of the graph shown in FIG. 6.

The description will be given of the case in which the unit driving mechanism fails to apply, due to malfunction or the like, the driving force in the width direction to the traveling unit 40 during the shift operation. In such a case, the guide roller 42 of the traveling unit 40 is guided from the guide releasing point to the guide restarting point with abutting on the abutting surface 18a of the forward shift roller 18, and the shift operation is forcibly carried out. At this time, since the abutting surface 18a of the forward shift guide 18 has the above-mentioned shape, the velocity in the width direction of the traveling unit 40 running by the driving force, applied by the linear motor, to run at a constant velocity in the extending direction varies as shown in FIG. 5.

The shift operation at the time that the transport vehicle 30 running in the reverse direction (the opposite direction to the direction shown by the arrow in FIG. 2) goes off the sub-rail 12 and goes into the main rail 11 is the same. Namely, after the guiding operation of the guide rollers 41 and 43 of the traveling unit 40 by the direction control guide 17 is released, the unit driving mechanism carries out the shift operation, by its driving force, to shift the traveling unit 40 running at a constant velocity in the extending direction to the position at which the guide roller 44 is guided by the direction control guide 15. The velocity of the traveling unit 40 in the width direction during the shift operation is controlled to vary as shown in FIG. 5.

During the shift operation while the traveling unit 40 is running in the reverse direction, the guide roller 43 on the one side of the width direction (the right side in FIG. 2) and on the front side in the traveling direction abuts on the abutting surface 19a of the reverse shift guide 19. Namely, the abutting surface 19a of the reverse shift guide 19 intersects the virtual extension line of the direction control guide 17 (shown by broken axis line 203) along the extending direction of the connection guide 13. Further, the abutting surface 19a extends from a guide releasing point to a guide restating point. The guide releasing point is a point, at which the guide roller 43 of the traveling unit 40 whose guiding operation by the direction control guide 17 is released abuts on the abutting surface 19a. The guide restating point is a point, at which the guide roller 43 abuts on the abutting surface 19a when the guide roller 44 of the traveling unit 40 is at the position to be guided by the direction control guide 15. The shape of the guiding direction of the abutting surface 19a of the reverse shift guide 19 coincides with the curve of the graph shown in FIG. 6. It is noted that none of the guide rollers 41 to 44 abuts on the forward shift guide 18 during the shift operation in the reverse traveling direction.

Figure 7:
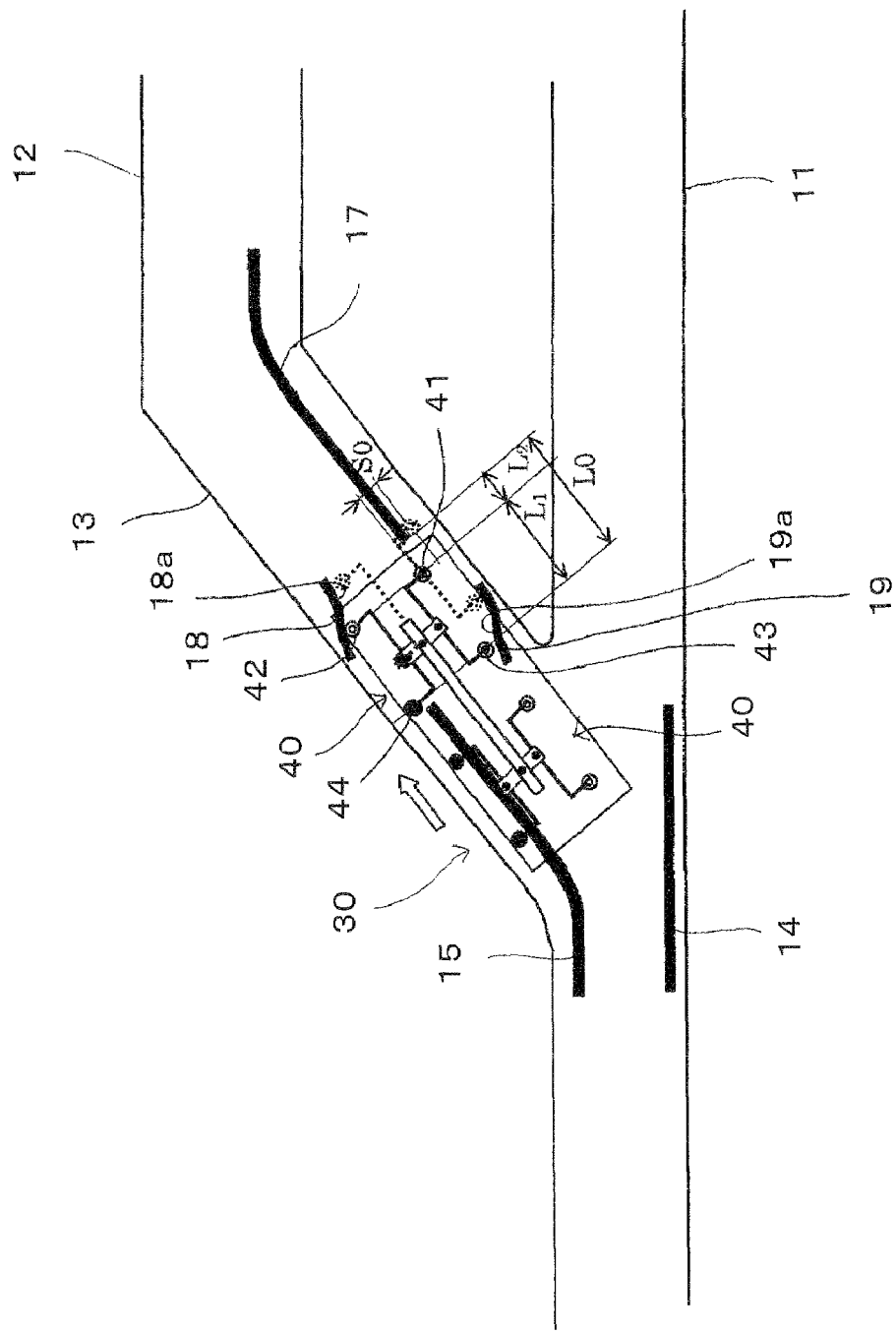
FIG. 7 shows the forward shift guide and the reverse shift guide provided on a "Y"-shape area of the rail shown in FIG. 1.

The forward shift guide 18 and the reverse shift guide 19 as described above are provided at a "H"-shaped position on the rail 10 where the transport vehicle 30 running in the forward direction travels from the main rail 11 to the sub-rail 12 as shown in FIG. 2. In addition, the forward shift guide 18 and the reverse shift guide 19 are provided at the "H"-shaped position where the transport vehicle 30 travels from the sub-rail 12 to the main rail 11, at the "Y"-shaped position where the transport vehicle 30 travels from the main rail 11 to one end (the left end in FIG. 1) of the sub-rail 12 (see. FIG. 7), and at the "Y"-shaped position where the transport vehicle 30 travels from the other end (the right end in FIG. 1) of the sub-rail 12 to the main rail 11.

As described above, the OHT 1 in this embodiment includes the direction control guide 15 which is provided on the other side (the left side in FIG. 2) of the width direction of the connection rail. 13 connecting the main rail 11 and the sub-rail 12 and which extends to the extending direction of the connection rail 13; and the direction control guide 17 which is provided on the one side (the right side in FIG. 2) of the width direction of the connection rail 13, which is spaced from the direction control guide 15 in the extending direction of the connection rail 13 by the interval area and which extends in the extending direction of the connection guide 13. In addition, the OHT 1 includes the forward shift guide 18 guiding the traveling unit 40 to the position at which the guide roller 41 of the traveling unit 40 is guided by the direction control guide 17 after the guiding operation of the guide roller 42 and 44 of the traveling unit 40 by the direction control guide 15 is released, when the transport vehicle 30 travels in the forward direction (the direction shown by the arrow in FIG. 2). Therefore, even if there happens a malfunction during the shift operation, e.g., the delay of the shift timing of the traveling unit 40 by the unit driving mechanism, the traveling unit 40 is guided by the forward shift guide 18 and is shifted to the position at which it is guided by the direction control guide 17, after the guiding operation by the direction control guide 15 is released. Therefore, it is necessary that the length L0 of the interval area in which the guiding operation is transferred from the direction control guide 15 to the direction control guide 17 is the sum of the length L1 of one traveling unit 40 in the traveling direction and the distance L2 that the traveling unit 40 runs during the shift operation, and it is unnecessary to ensure the length for the emergency stop of the transport vehicle 30. Therefore, the connection rail 13 can be shortened for the length required for such emergency stop.

Further, in the OHT 1 in this embodiment, the forward shift guide 18 intersects the virtual extension line of the direction control guide 15 extending in the extending direction of the connection rail 13 and extends from the guide releasing point to the guide restarting point. In addition, the forward shift guide 18 has the abutting surface 18a which abuts on and guides the guide roller 42. Therefore, the guide roller 42 can be securely guided from the guide releasing point to the guide restarting point.

Furthermore, in the OHT 1 in this embodiment, the shape of the abutting surface 18a of the forward shift guide 18 in the guiding direction is determined such that the velocity of the traveling unit 40, in the width direction of the connection rail 13, traveling in the extending direction of the connection guide 13 at a constant velocity and guided by the forward shift guide 18 first increases with a constant acceleration, keeps a constant velocity for a predetermined time period after reaching the constant velocity and then decreases with a constant acceleration after the passage of the predetermined time period. Therefore, even if the traveling unit 40 is forcibly shifted by the forward shift guide 18 at the time of malfunction of the shift operation, the impact on the transport vehicle 30 can be reduced. Hence, it can be prevented that any deficiency occurs to the substrates accommodated in the FOUP 60 held by the transport vehicle 30.

In addition, the OHT 1 in this embodiment includes the reverse shift guide 19 which guides the traveling unit 40 to the position at which it is guided by the direction control guide 15 after the guiding operation by the direction control guide 17 is released, when the transport vehicle 30 travels in the reverse direction. Therefore, when the transport vehicle 30 moved in the reverse direction in a case of recovery from a trouble or maintenance work, for example, it is unnecessary to ensure the length for the emergency stop of the transport vehicle 30 at the time of a malfunction. Namely, if the interval area has a length of the sum of the length L1 of one traveling unit 40 in the traveling direction and the distance L2 that the traveling unit 40 runs during the shift operation, the traveling unit 40 can be shifted to the position at which it is guided by the direction control guide 15, after the guiding operation by the direction control guide 17 is released.

Further, in the OHT 1 in this embodiment, the reverse shift guide 19 intersects the virtual extension line of the direction control guide 17 extending in the extending direction of the connection rail 13 and extends from the guide releasing point to the guide restarting point. In addition, the reverse shift guide 19 has the abutting surface 19a which abuts on and guides the guide roller 43. Therefore, the guide roller 43 can be securely guided from the guide releasing point to the guide restarting point.

Furthermore, the shape of the abutting surface 19a of the forward shift guide 19 in the guiding direction is determined such that the velocity of the traveling unit 40, in the width direction of the connection rail 13, traveling in the extending direction of the connection guide 13 at a constant velocity and guided by the forward shift guide 19 first increases with a constant acceleration, keeps a constant velocity for a predetermined time period after reaching the constant velocity and then decreases with a constant acceleration after the passage of the predetermined time period. Therefore, even if the traveling unit 40 is forcibly shifted by the reverse shift guide 19 at the time of malfunction of the shift operation, the impact on the transport vehicle 30 can be reduced. Hence, it can be prevented that any deficiency occurs to the substrates accommodated in the FOUP 60 held by the transport vehicle 30.

Next, the advantage of the OHT 1 according to the present invention will be described in comparison with a comparative example below. FIG. 9 is a plan view of a transport vehicle 130 of a transport apparatus according to a comparative example. The transport vehicle includes a vehicle unit 131 which holds the transported object in a suspension manner, and two traveling units 140 arranged on the front and rear part of the vehicle unit 131 in the traveling direction (the direction shown by the arrow in FIG. 9) Each of the traveling units 140 has two guide rollers on both sides in its width direction (the direction perpendicular to the traveling direction), i.e., four guide rollers 141 to 144 in total. The traveling unit 140 can shift in the width direction by the driving force of the unit driving mechanism not shown. The two traveling units 140 are linked with each other by the unit link member 148 in a rotatable manner.

The transport apparatus shown in FIG. 9 has the "H"-shaped rail in which a branch and a junction are provided in series. Specifically, the rail shown in FIG. 9 includes the main rail 111 and the sub-rail 112 in parallel with each other and extending in the right-left direction in FIG. 9, and a connection rail 113 extending from the lower left area to the upper right area in FIG. 9 and connecting the main rail 111 and the sub-rail 112.

Near the connection area of the main rail 111 and the sub-rail 113, there are provided direction control guides 114 and 115. The direction control guide 114 extends in the extending direction of the main rail 111 on one side (the lower side in FIG. 9) of the width direction of the main rail 111. The direction control guide 115 extends in the extending direction of the connection guide 113 on the other side (the left side in FIG. 9) of the width direction of the connection guide 113 and also extends to the main rail 111.

Similarly, near the connection area of the sub-rail 112 and the connection rail 113, there are provided direction control guides 116 and 117. The direction control guide 116 extends in the extending direction of the sub-rail 112 on the other side (the upper side in FIG. 9) of the width direction of the sub-rail 112. The direction control guide 117 extends in the extending direction of the connection rail 113 on one side (the right side in FIG. 9) of the width direction of the connection rail 113, and also extends to the sub-rail 112. In the connection rail 113, the direction control guides 115 and 117 are apart from each other in the extending direction of the connection rail 113 by the interval area having the length L10.

The description will be given of the operation in the comparative example, in which the transport vehicle 130 traveling in the right direction in FIG. 9 of the main rail 111 runs off the main rail 111 and runs to the sub-rail 112 in the "H"-shaped rail shown in FIG. 9. First, the traveling unit 140 is shifted to the other side (the upper side in FIG. 9) of the width direction by the driving force of the unit driving mechanism such that the guide rollers 142 and 144, positioned on the other side of the width direction, of the traveling unit 140 traveling on the main rail 111 is guided by the direction control guide 115 extending into the connection rail 113. In this state, the transport vehicle 130 is moved to the connection area of the main rail 111 and the connection rail 113 to move the transport vehicle 130 into the connection rail 113.

Then, as shown in FIG. 9, after the guide operation of the guide rollers 142 and 144 of the traveling unit 140 on the front side by the direction control guide 115 is released, the traveling unit 140 is shifted in the width direction by the driving force of the unit driving mechanism, and is moved to the position at which the guide roller 141 of the traveling unit 140 on one side of the width direction and on the front side in the traveling direction is guided by the direction control guide 117. Thus, the guide rollers 141 and 143 of the traveling unit 140 on the front side are guided by the direction control guide 117. The traveling unit 40 on the rear side is also shifted in the same manner when the guide operation of the guide rollers 142 and 144 by the direction control guide 115 is released. Thereby, the transport vehicle 130 runs into the sub-rail 112.

As described above, in the transport apparatus of the comparative example, the interval area in which the traveling unit 40 is transferred from the direction control guide 115 to the direction control guide 117 has the length L10 which is at least longer than the sum of the length L11, the distance L12 and the length L13. The length L11 is the length of one traveling unit 140 along the traveling direction. The distance L12 is a distance for which the traveling unit 40 runs during the shift operation of the traveling unit 140 by the unit driving mechanism. The length L13 is a length necessary for the transport vehicle 130 to stop in an emergency when the traveling unit 140 must be stopped due to the failure of the shift operation, such as the delay of the timing of shifting the traveling unit 140.

On the contrary, according to the transport apparatus of the present invention, it is necessary that the interval area has the length L0 which is shorter than the length L10 in the above-described comparative example. Therefore, in the present invention, the interval area can be reduced, and hence the length of the connection rail can be shortened. Thereby, necessary space for the transport apparatus can be reduced.

While the preferred embodiment of the present invention is described above, the application of the present invention is not limited to those described in the above embodiment, and various change and modification in design may be performed within the range of the appended claims.

For example, in the above-described embodiment, there is provided the reverse shift guide 19 having the abutting surface 19a on which the guide roller 43 abuts when the transport vehicle 30 traveling in the reverse direction carries out the shift operation. However, the reverse shift guide 19 may be omitted.

Figure 8:
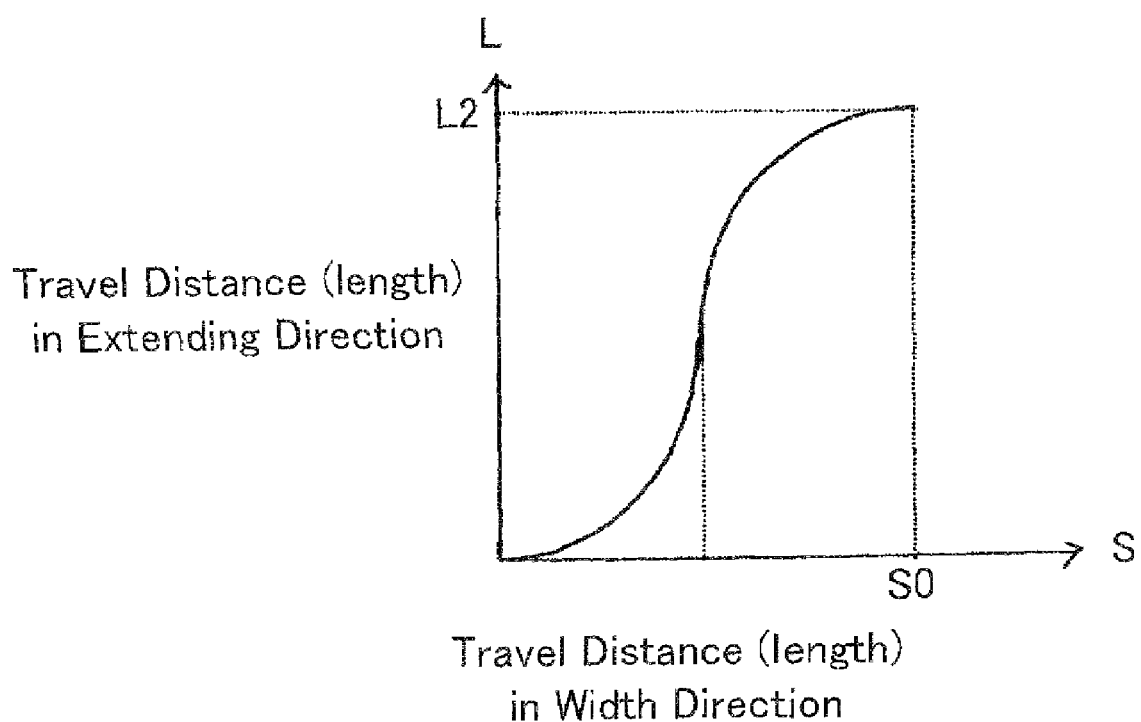
FIG. 8 shows a modified example of the shape of the abutting surface, along the guiding direction, of the forward shift guide and the reverse shift guide shown in FIG. 6.

In the above embodiment, the shapes of the abutting surface 18a of the forward shift guide 18 and the abutting surface 19a of the reverse shift guide 19 are both determined such that the velocity of the traveling unit 40 in the width direction of the connection rail 13 during the shift operation first increases with a constant acceleration, keeps a constant velocity for a predetermined time period after reaching the constant velocity and then decreases with a constant acceleration after the passage of the predetermined time period. Namely, the shape of the abutting surface 18a and 19a is as shown in FIG. 6. However, the application of the invention is not limited to this example. The shape of the abutting surface 18a and 19a along the guiding direction maybe the sine curve shape corresponding to ½ period as shown in FIG. 8.

Further, in the above embodiment, the transport vehicle 30 has two traveling units 40 arranged in line in the traveling direction. However, the transport vehicle 30 may have three or more traveling units 40.

Still further, in the above embodiment, the present invention is applied to the OHT 1, which is a rail transport apparatus of ceiling traveling type and in which the transport vehicle 30 travels in the suspended fashion. However, the application of the invention is not limited to this. For example, the present invention can be applied to the rail transport apparatus of ground traveling type in which the transport vehicle travels on the rail provided on the floor.

The entire disclosure of Japanese Patent Application No. 2006-311595 filed on Nov. 17, 2006 including the specification, claims, drawings and summary is incorporated herein by reference in its entirety.

What is claimed is:

1. A rail transport apparatus, comprising:
a rail including a first major rail, a second major rail;
a connection rail connecting the first major rail and the second major rail, the connection rail having a length extending in an extending direction and a width spanning between a first side of the connection rail and an opposite second side of the connection rail;
a first direction control guide on the first side of the connection rail extending to the first major rail in the extending direction of the connection rail;
a second direction control guide on the second side of the connection rail, the second direction control extending to the second major rail in the extending direction of the connection rail in a manner not overlapping with the first direction control guide;
a transport vehicle supported and guided by the rail for travelling along the rail, the transport vehicle including a plurality of roller units, each roller unit having a first roller positioned at a first end on a first side of the roller unit configured to be guided by the first direction control guide, and a second roller positioned at a second end on a second side of the roller unit opposite the first side of the roller unit and configured to be guided by the second direction control guide; and
a forward shift guide configured to guide the roller units as the transport vehicle travels in a forward direction from the first major rail to the second major rail,
wherein the forward shift guide is configured to guide each roller unit of the roller units to a position at which the second roller is guided by the second direction control guide after a guiding operation of the first roller of the roller unit by the first direction control guide is released,
wherein each of the roller units are movable to shift in a width direction of the connection rail,
wherein the first roller is guided by the first direction control guide only when the roller unit is shifted to the first side of the connection rail, and the second roller is guided by the second direction control guide only when the roller unit is shifted to the second side of the connection rail, and
wherein the forward shift guide is positioned on the connection rail and configured to forcibly shift the first roller and the second roller.

2. The rail transport apparatus according to claim 1,
wherein the forward shift guide intersects an axis of the first direction control guide extending in the extending direction of the connection rail,
wherein the forward shift guide extends to a a location for abutting on the first roller when the second roller is at the position at which the second roller is guided by the second direction control guide, and
wherein the forward shift guide has a forward-shift abutting surface configured to abut on and guide the first roller.

3. The rail transport apparatus according to claim 2, wherein a shape of the forward-shift abutting surface in a guiding direction is a sine curve shape.

4. The rail transport apparatus according to claim 2, wherein a shape of the forward-shift abutting surface is configured such that a velocity of the roller unit, in the width direction of the connection rail, guided by the forward shift guide and traveling at a constant velocity in the extending direction of the connection rail first increases with a constant acceleration, keeps a constant velocity for a time period after reaching the constant velocity, and decreases with the constant acceleration after the time period has passed.

5. The rail transport apparatus according to claim 1, further comprising a reverse shift guide positioned on the connection rail and configured to guide the roller unit to a position at which the first roller of the roller unit is guided by the first direction control guide, after a guiding operation of the second roller of the roller unit by the second direction control guide is released, when the transport vehicle travels on the rail in a reverse direction from the second major rail to the first major rail.

6. The rail transport apparatus according to claim 5,
wherein the reverse shift guide intersects an axis of the second direction control guide extending in the extending direction of the connection rail,
wherein the reverse shift guide extends to a location for abutting on the second roller when the first roller is at the position at which the first roller is guided by the first direction control guide, and
wherein the reverse shift guide has a reverse-shift abutting surface configured to abut on and guide the second roller.

7. The rail transport apparatus according to claim 6, wherein a shape of the reverse-shift abutting surface in a guiding direction is a sine curve shape.

8. The rail transport apparatus according to claim 6, wherein a shape of the reverse-shift abutting surface is configured such that a velocity of the roller unit, in the width direction of the connection rail, guided by the reverse shift guide and traveling at a constant velocity in the extending direction of the connection rail first increases with a constant acceleration, keeps a constant velocity for a time period after reaching the constant velocity and decreases with the constant acceleration after the time period has passed.

* * * * *